INVENTOR.
FRANK CARAPICO, JR.
BY
Edelson and Udell
ATTORNEYS.

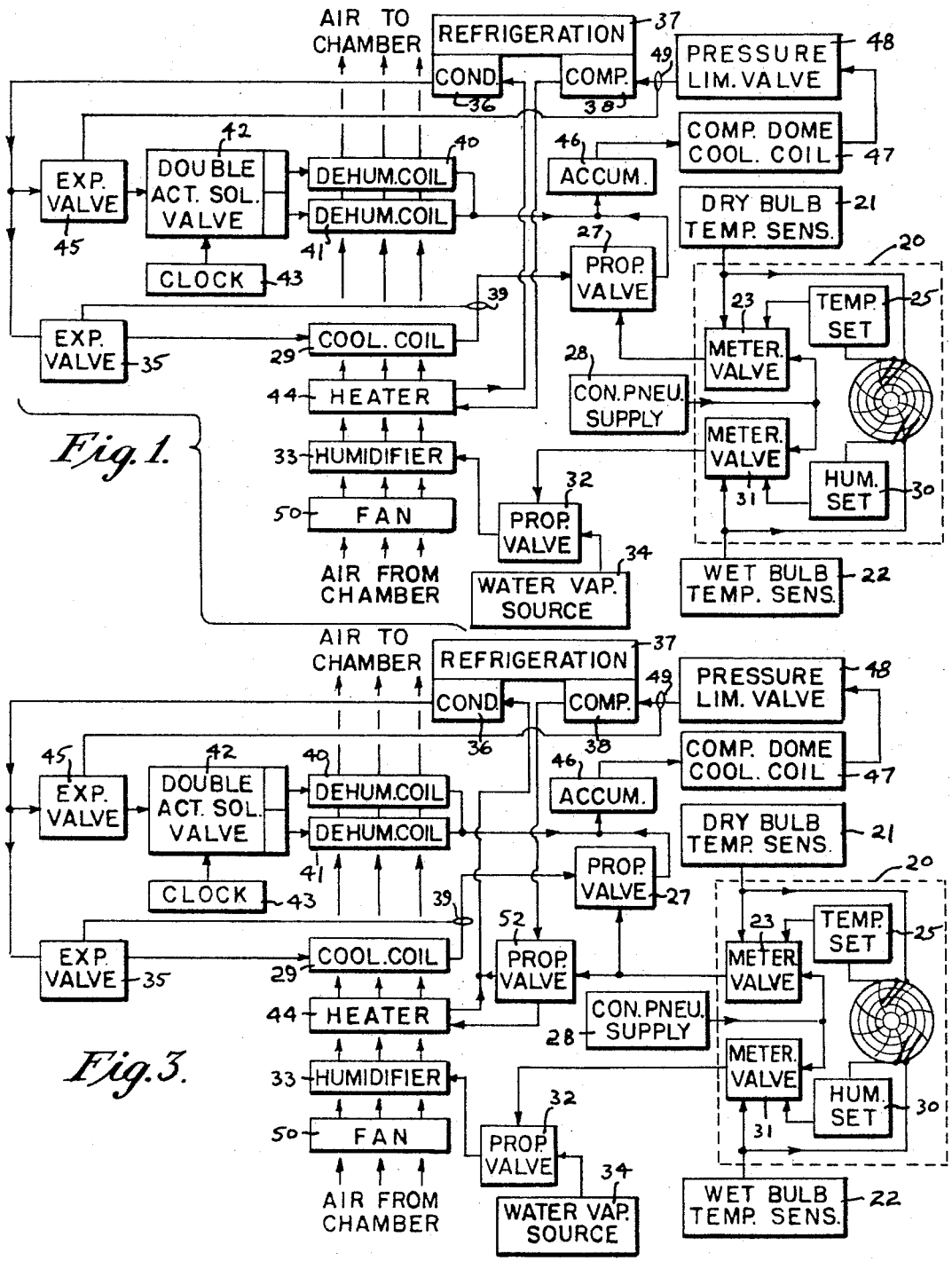

May 20, 1969      F. CARAPICO, JR      3,444,921
ENVIRONMENTAL CONTROL SYSTEM
Filed Sept. 5, 1968      Sheet 3 of 3
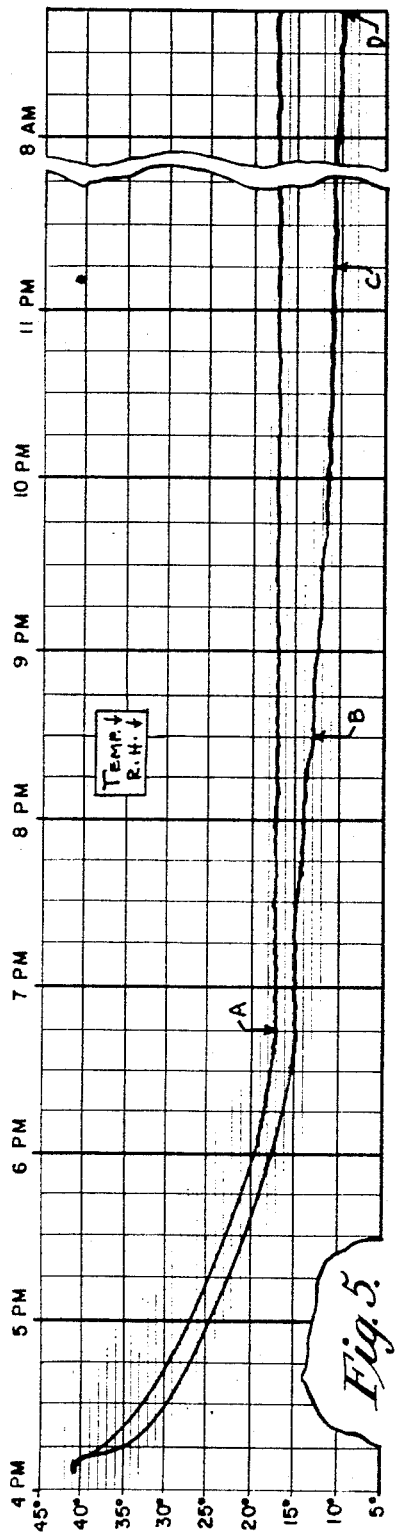
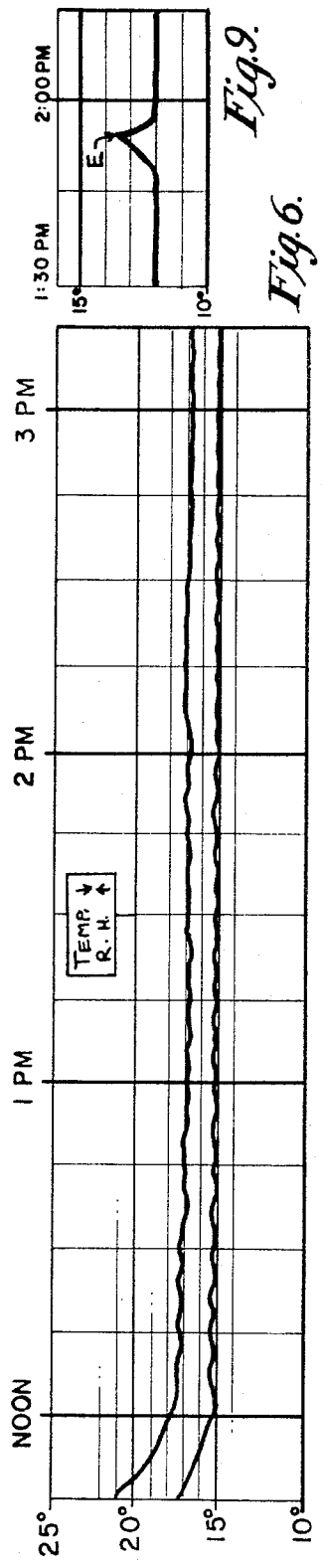
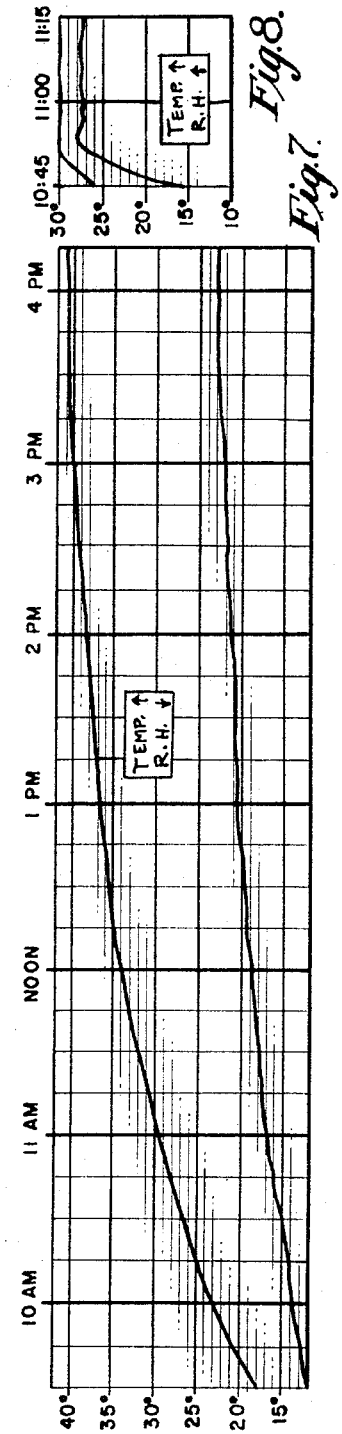
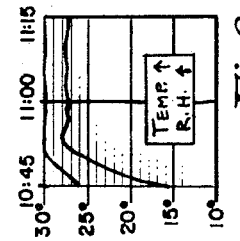
INVENTOR.
FRANK CARAPICO, JR.
BY
Nelson and Udell
ATTORNEYS.

United States Patent Office 3,444,921
Patented May 20, 1969

---

3,444,921
ENVIRONMENTAL CONTROL SYSTEM
Frank Carapico, Jr., 3025 Hermosa Lane,
Havertown, Pa. 19083
Filed Sept. 5, 1968, Ser. No. 757,675
Int. Cl. F25b 25/02; F24f 3/14
U.S. Cl. 165—21                 14 Claims

ABSTRACT OF THE DISCLOSURE

An environmental chamber control system including apparatus for automatically cooling, heating, humidifying and dehumidifying the chamber atmosphere in response to the settings of manually settable temperature and humidity controls utilized in conjunction with dry-bulb and wet-bulb temperature sensors. One system uses continuous dehumidification and heating combined with continuously modulated variable rate cooling and variable rate humidification, and a variant system uses continuous dehumidification with modulated variable rate humidification, variable rate cooling and variable rate heating, the cooling and heating apparati being controlled in a see-saw system. Dehumidification is effected by a refrigeration system of thermal absorption capacity less than the thermal input capacity of the heating apparatus to achieve dehumidification without affecting chamber temperature. Humidification is achieved with water vapor injection, and heating is preferably achieved by utilization of the heat content of the hot refrigerant gas discharged by the refrigeration system compressor. The temperature and pressure of the refrigerant gas returning to the compressor are monitored at the compressor inlet and regulated to prevent compressor overheating and overpressure, and liquid slugback is prevented by use of an accumulator in the suction line.

---

This invention relates to environmental control systems and more particularly to a system for precisely controlling the temperature and humidity within wide ranges within an enclosed chamber.

In the past, systems and apparatuses have been devised for the same purpose toward which the present invention is directed but have been found lacking in certain respects. For example, many systems have been able to achieve wide ranging temperature control but have not been able to achieve effective and proper humidity control. Some systems which are able to achieve a desired temperature and humidity insofar as the end point stabilized conditions are concerned have nevertheless done this in a manner which is completely unacceptable for many important applications, as for example in biological research applications. It is, for example, not acceptable to achieve a desired low humidity state by a method which first chills the air in the environment all the way down to dew-point and then after extracting the moisture performs a reheating process to restore the desired higher temperature condition. This type of cycling can have disastrous effects upon sample specimens in the environmental chamber. Accordingly, it is a primary object of this invention to provide temperature control accurate within ½° C. between 10° C. and 40° C. while simultaneously providing relative humidity control within an accuracy of 5% between 35% and 100% relative humidity at any temperature within the specified range.

Another object of the invention is to provide an environmental control system which effects dehumidification without significant affect upon the environmental temperature.

Yet another object of the invention is to provide the aforesaid environmental control conditions by utilizing separate systems for cooling, heating, dehumidifying and humidifying the air within the chamber, at least one of such systems being steady-state in operation, with at least two of the remaining systems being normally continuously modulated.

A further object of the invention is the provision of means for regulating the pressure, temperature and liquid content of the refrigerant gas returning to the compressor in the cooling system to prevent overheating or overpressure of the compressor or liquid slugback which would result in compressor breakdown.

The foregoing and other objects of the invention will become clear from a reading of the following specification in conjunction with an examination of the appended drawings, wherein:

FIGURE 1 illustrates one form of the invention employing steady-state or continuous heating and dehumidification combined with modulated cooling and humidification systems;

FIGURE 3 illustrates a system similar to that of FIGURE 1 but in which continuous dehumidification is utilized with modulated cooling, humidification and heating;

FIGURE 5 is a graph showing a change of conditions to procedure a decrease in both temperature and relative humidity;

FIGURE 6 is a graph illustrating a temperature decrease attended by relative humidity increase within the controlled environment;

FIGURE 7 is a graph illustrating temperature increase and relative humidity decrease;

FIGURE 8 is a chart showing increase of both temperature and relative humidity; and FIGURE 9 illustrates the sensitivity of the system to a sudden condition change such as would be produced by opening and closing a door into the chamber.

In the several figures, like elements are denoted by like reference characters.

Figure 4:
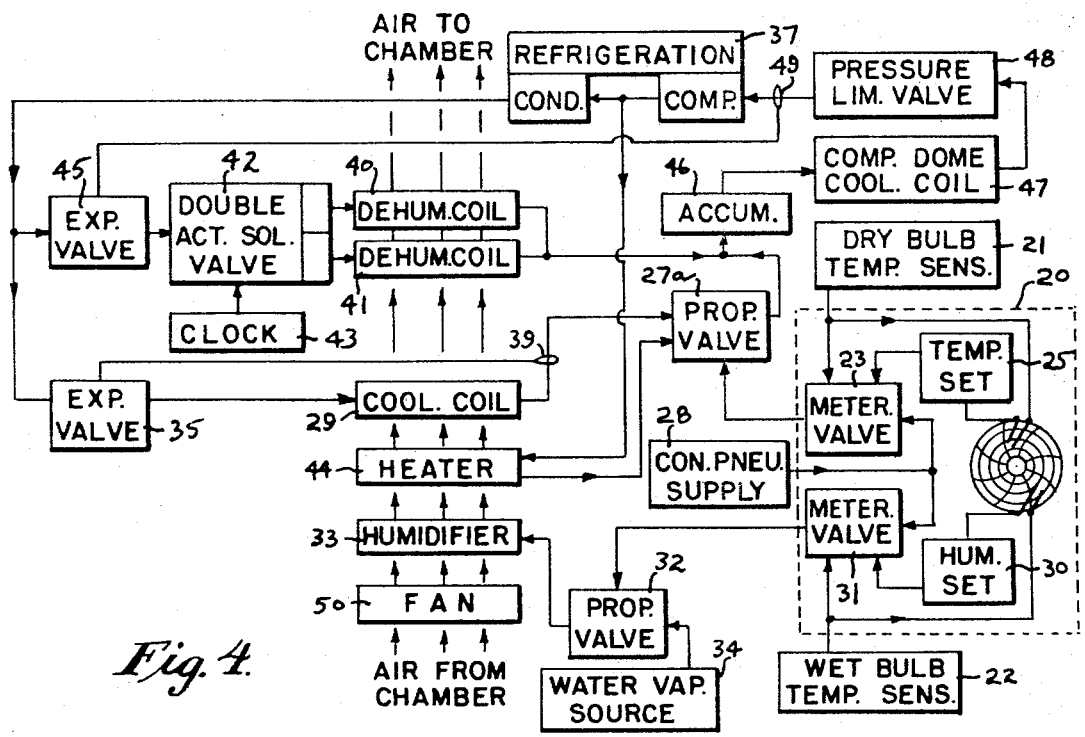
FIGURE 4 is a further modification of the system of FIGURE 3 to provide a capacity control system.

FIGURE 1 illustrates a system utilizing steady-state heat input and dehumidification systems which are sufficient to produce the maximum temperature and lowest realtive humidity desired when unopposed by the refrigeration and humidification systems, these latter systems being modulated inputs which are modulated proportionally as a function of the difference between the desired environmental conditions and the actual environmental conditions. During steady-state conditions when the desired conditions have been obtained, all four systems are operating with the humidification and cooling systems being modulated between limits greater than completely off and less than completely on. During pull-up and pull-down, the modulated systems can be completely off to reduce the time required to achieve the desired conditions.

Control of the system is carried out by means of two-control two-record controller designated generally in FIGURE 1 by the reference character 20, one suitable instrument for this purpose being the Series 502 A/D Recording Pneumatic Controller manufactured by the Bristol Company of Waterbury, Conn. The controller instrument is used in conjunction with a dry-bulb temperature sensor 21 and wet-bulb temperature sensor 22, the dry-bulb sensor indicating the chamber temperature while the wet-bulb sensor senses the relative humidity in accordance with the normal psychometric relationships. The output signal from the dry-bulb sensor 21 is routed to a metering valve 23 and also to a recording pen 24. A temperature set control 25 also sends a signal to the metering valve 23 and is connected to an indicator 26 which by engagement with the recording pen 24 gives an indication when the sensed temperature of the chamber is the same as that which has been set into the temperature control 25.

The metering valve 23 regulates the air pressure which is delivered to proportioning valve 27 from the continuous pneumatic supply 28, and this regulation is controlled by the difference between the signals delivered to the metering valve 23 by the temperature control 25 and the drybulb sensor 21. A large temperature difference between the set temperature and the chamber, so long as the chamber temperature is the higher of the two, will produce a large opening of the metering valve 23 to effect wide opening of proportioning valve 27 to thereby produce maximum cooling from the cooling coil 29. As the chamber temperature drops and the differential between the set temperature and the chamber temperature decreases, the metering valve 23 throttles back to thereby throttle back the proportioning valve 27 and proportionally reduce the cooling effect produced by the cooling coil 29. When the chamber temperature and the set temperature are exactly the same the metering valve 23 will be closed sufficiently to only permit operation of the cooling coil 29 to offset the effect of the heating system hereinafter described and any externally imposed heat load.

The wet-bulb temperature sensor 22 and the humidity set control 30 operate in exactly the same manner with respect to the metering valve 31 and proportioning valve 32 to thereby control the rate of delivery of water vapor to the humidifier 33 from the water vapor source 34. When the chamber relative humidity and the set relative humidity are exactly the same the metering valve 31 will be closed sufficiently to only permit operation of the humidifier 33 to offset the effect of the dehumidifying system hereinafter described. Steam has been found to be an excellent water vapor source, but any other suitable vapor source may be utilized. In this regard, it has been found that water bath devices are not satisfactory because they cannot be controlled with the precision required.

From the foregoing, it will be appreciated that the cooling and humidification systems are variable rate modulated systems which are directly controlled by the temperature and humidity sensors 21 and 22 in conjunction with the controller mechanism 20. Refrigerant for the cooling coil system 29 is obtained in a conventional manner through an expansion valve 35 from the condenser/receiver 36 of the refrigeration system 37 which also includes the compressor 38. The expansion valve 35 is of course controlled by the capillary 39 which senses the temperature of the refrigerant leaving the cooling coil 29.

The dehumidification system consists of a pair of dehumidification coils 40 and 41 which are activated in alternation by a double-acting solenoid valve 42 controlled by a clock 43, the coils 40, 41 and 29 preferably all being part of a split coil structure. Each of the dehumidifying coils is of course a refrigerating coil and reduces to dew point the air immediately around the coil so that moisture may be extracted therefrom and removed from the chamber. Of course the size of these coils is much smaller than that of the cooling coil 29 and the cooling effect on the chamber air of the dehumidifying coils is more than offset by the heating effect of heater 44 to be hereinafter described.

Refrigerant from the condenser/receiver 36 passes through the expansion valve 45 and into the double-acting solenoid valve 42 where it is for example then routed through dehumidifying coil 40 while being blocked from dehumidifying coil 41. The clock 43 is set to actuate the solenoid valve 42 to shift the refrigerant from dehumidifying coil 40 to dehumidifying coil 41 after a predetermined length of time to insure that not more than a predetermined icing condition may have occurred on dehumidifying coil 40. The extracted moisture on dehumidifying coil 40 is removed through a run-off system as it melts down while the dehumidifying function is being continuously carried on by activated coil 41. After an equal length of time, the clock 43 again shifts the solenoid valve 42 so that refrigerant is again run through coil 40 and blocked from coil 41 so that moisture collection from coil 41 may then be effected. This sequence goes on continuously within the environment.

If the humidification level within the chamber tends to drop below the set point as determined by the humidity controller 30, then the humidifier 33 is of course actuated to a proportionally greater degree as required to maintain the humidity level at the desired point. Since dehumidification is going on constantly, it will be appreciated that the humidifier 33 is being modulated by the proportioning valve 32 at just the precise amount of humidity injection required to offset the dehumidification effect of the coils 40 and 41 to exactly maintain the preset humidity level as determined by the controller 30.

In the normal manner, the refrigerant coming from the receiver 36 to expansion valves 35 and 45 is in the form of a warm liquid which emerges from the dehumidifying coils 40 and 41, as well as from the cooling coil 29, as a cool gas. The cool gas from the dehumidifying coils and from the proportioning valve 27 flows to an accumulater 46 where in the known manner any liquid phase refrigerant drops out and is collected to prevent liquid slugback to the compressor, while the gas is then routed to the compressor dome cooling coil 47 to help cool the compressor 38. From the cooling coil 47 the refrigerant gas then flows to a pressure limiting valve 48 and thence into the refrigeration compressor 38. The capillary 49 which controls expansion valve 45 monitors the temperature of the gas returning to the compressor at the compressor inlet rather than at the outlet of the dehumidifying coils 40 and 41. Consequently, if the temperature of the returning refrigerant gas at the compressor inlet is too high, the expansion valve 45 opens wider to permit more refrigerant to flow through the dehumidifying loop and through the compressor dome cooling coil back to the compressor to thereby prevent compressor overheating. The pressure limiting valve 48 limits the pressure at the compressor inlet during maximum temperature pulldown to the maximum value which the compressor can safely work against.

The steady-state heat input to the environmental chamber is provided by routing the hot gas from the compressor outlet through the heater 44 before returning it to the condenser/receiver 36 to thereby heat the chamber atmosphere in contact with the heater. A fan 50 circulates the chamber air through the humidifying, heating, cooling and dehumidifying systems on a continuous basis to maintain uniform conditions throughout the chamber.

Figure 2:
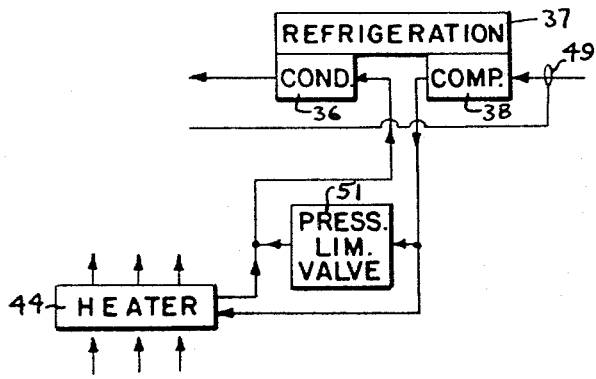
FIGURE 2 illustrates a modification to FIGURE 1 in which a pressure limiting by-pass valve is utilized to limit the compressor head pressure to a predetermined level.

FIGURE 2 illustrates a modification of the apparatus of FIGURE 1 in that a pressure limiting valve 51 is connected as a by-pass between the hot gas lines coming from the compressor 38 and returning to the condenser/receiver 36 after passing through the heater 44. The pressure limiting valve 51 is so adjusted that in the event of head pressure build-up due to restricted flow rate of the compressed hot gas through the heater 44, the excess pressure is bled off through the pressure limiting valve 51 by passing a portion of the compressed gas directly into the refrigerant line going to the condenser/receiver 36 and by-passing the heater 44 completely. This condition could occur because the heater 44 is designed to provide a predetermined desired steady-state heat input to the system and is therefore designed to operate with a predetermined refrigerant gas pressure and temperature. The compressor head pressure and temperature do vary and in some cases will then require the use of a pressure limiting valve 51 to preserve the system function within desired limits.

FIGURE 3 is similar to the apparatus of FIGURE 1 but shows a further modification beyond that of FIGURE 2 which converts the heater 44 from a steady-state input to a variable rate modulated input. This is accomplished by the use of a proportioning valve 52 in the hot gas line coming from the compressor 38 and going to the heater 44. The proportioning valve 52 is provided with two outlets, one of which goes to the heater 44 while the second connects into the line which returns from the heater 44 to the condenser/receiver 36, in similar manner to the outlet of the pressure limiting valve 51 shown in FIGURE 2. The proportioning valve 52 is controlled by the same pneumatic pressure supply from metering valve 23 as is used to control the proportioning valve 27 for the cooling coil 29. The difference is that proportioning valve 52 is arranged to function inversely to proportioning valve 27 so that when valve 27 is opening valve 52 is closing to thereby simultaneously increase the cooling effect through coil 29 and decrease the heating effect through heater 44. Similarly, when proportioning valve 27 is closing to reduce the cooling effect of coil 29 then proportioning valve 52 is opening to increase the heating effect of heater 44. The heater 44 and cooling coil 29 are thus arranged in a see-saw control system which reduces the lag time in effecting a change of temperature, and also increases the system sensitivity to accomplish rapid temperature corrections about the stabilized desired temperature condition. The remainder of the apparatus of FIGURE 3 is exactly the same as that previously described in connection with FIGURE 1, functions in the same manner, and the elements are identified with the same reference characters.

FIGURE 4 illustrates a further modification which, like FIGURE 3, illustrates a system in which there is a single steady-state input, that of dehumidification, while the remaining aspects of cooling, heating, and humidifying are all variable rate modulated inputs. The arrangement of FIGURE 4 is also similar to that of FIGURE 3 in that the see-saw control of cooling and heating is also present but is effected in a somewhat different manner. It also differs from the system of FIGURE 3 in that the hot gas return from the heater 44 is not routed back to the condenser/receiver 36 but is instead recirculated back into the inlet of compressor 38. This provides much more effective compressor cooling and makes unnecessary the use of the compressor dome cooling coil 47.

Structurally, the system of FIGURE 4 replaces the proportioning valve 27 and the proportioning valve 52 of FIGURE 3 with a single proportioning valve 27a having two inputs, one of which is fed from the output of the cooling coil 29 while the other of which is fed from the output of the heater 44. The input line to the heater 44 is fed from the hot gas output line of the compressor 38, which latter also now feeds directly to the condenser/receiver 36. The proportioning valve 27a is of the type which proportions its inputs so that when the input from cooling coil 29 is opened wider the input from heater 44 is proportionally closed and visa-versa. It will therefore be appreciated that the same see-saw effect between the cooling coil 29 and heater 44 is effected as with the system of FIGURE 3.

It will be further appreciated however, that the heater return, by feeding back into the proportioning valve 27a, is routed through the accumulator 46 and so forth back into the input of the compressor 38. This places a simulated heat load on the compressor which increases the available heater capacity as the demand for cooling decreases and the compressor is presented with a much more constant load condition than if the load were controlled almost exclusively by the cooling demand, which latter is of course quite variable. As is well appreciated in the art, this type of compressor operation is far more desirable than a highly variable load condition in terms of compressor life and efficiency.

A test unit built in accordance with principles of the invention provided temperature control between the limits of 4° C. and 40° C. at respective relative humidity ranges of 35% to 100% and 19% to 100% within the controlled range. The precision of control obtained within the range was 0.1° C. for dry-bulb temperature and 0.2° C. wet-bulb which equals 2% to 3½% relative humidity deviation within the range as a function of the particular dry-bulb temperature.

FIGURES 5 through 9 show graphs of actual performance of the test unit constructed in accordance with the principles of the invention. In all of FIGURES 5, 6, 7 and 8 the upper curve of the graph represents the dry-bulb temperature while the lower curve of the graph represents the wet-bulb temperature. FIGURE 9 shows a dry-bulb temperature only.

Referring first to FIGURE 5, it is observed that at the beginning of the chart the conditions shown illustrate a temperature of 41° C. and 100% relative humidity, and at this time the temperature controller 25 and humidity controller 30 were respectively set for a temperature of 17° C. and a relative humidity of 39%. The change of conditions illustrated by FIGURE 5 corresponds to a reduction of temperature and relative humidity, and accordingly the modulated humidification system remained off during the pull-down while the cooling system operated at maximum cooling during the initial period as shown by the steeper gradient of the temperature reduction curve which flattened out as the dry-bulb temperature approached point A on the graph at which the set-in control temperature of 17° C. was reached. Thereafter, the dry-bulb temperature remains constant while the wet-bulb temperature continues to depress until at point D on the graph it reaches the 10° wet-bulb temperature corresponding to 39% relative humidity at the dry-bulb temperature of 17° C. The relative humidities at the chart points A, B and C are respectively 81%, 63% and 47%.

FIGURE 6 illustrates the conditions wherein it is desired to obtain a temperature decrease with a relative humidity increase with the initial conditions being 21° C. at 71% relative humidity and the set-in desired terminal conditions being a temperature of 17° C. at a relative humidity of 81%. As shown, the initial differential of 4° C. between the dry-bulb and wet-bulb temperatures decreases to a differential of 2° C. at the stabilized set conditions.

The ripples on the curves should be particularly noted as to character and occurrence. It is observed in the graphs of both FIGURE 5 and FIGURE 6 that the initial sharp gradient pull-down portions of the curve are substantially without ripples designating a continuous or non-modulated action by the cooling apparatus and humidifying apparatus. However, as the steady-state conditions are approached the modulation of these systems becomes apparent, the initial rippling being of relatively larger amplitude and longer period than the subsequent ripples which are of shorter period and lower amplitude and become almost indistinguishable as ripples at full stabilization. It will of course be realized that the apparent final disappearance of the ripples is due only to the limit of resolution of the pen system of the chart recorder and that in fact the modulation is nevertheless continuous even at the stabilized conditions. It is this continuous modulation which provides the system with the ability to maintain extremely close control of temperature and humidity.

FIGURE 7 illustrates a change of conditions to provide an increase of temperature with a decrease of relative humidity from initial conditions of 18° C. and 49% relative humidity to final conditions of 41° C. and 20% relative humidity, the initial and final dry-bulb/wet-bulb temperature differentials being respectively 6° C. and 18° C.

FIGURE 8 illustrates a change of conditions to provide an increase in both temperature and relative humidity from initial conditions of 26° C. and 29% relative humidity to final conditions of 30° C. and 83% relative humidity, the initial and final dry-bulb/wet-bulb temperature differentials being respectively 11° C. and 2½° C.

FIGURE 9 illustrates the sharp response of the system to a sudden change in temperature occasioned by the opening of the environmental chamber door. From the graph it is observed that the door was open for approximately five minutes which produced a temperature increase of about 1½° C., and that upon closure of the door, at the cusp E on the graph, the temperature was reduced to the set point in about two minutes. Of particular significance is the steep gradient of the recovery portion of the curve.

Having now described my invention in connection with particularly illustrated embodiments thereof, it will be recognized that modifications and variations of the invention many occur from time to time to those persons normally skilled in the art without departing from the essential scope or spirit of my invention, and accordingly it is intended to claim the same broadly as well as specifically as indicated by the appended claims.

What is claimed as new and useful is:

1. An environmental chamber control system for use in conjunction with a closed chamber for creating and maintaining within the chamber settable atmospheric conditions of temperature and humidity as desired, comprising in combination.
   (a) humidifying means effective when operated to increase the humidity level within the chamber by injecting water in vapor form into the chamber atmosphere,
   (b) cooling means effective when operated to reduce the temperature of the chamber atmosphere by absorbing and removing heat therefrom without affecting the water vapor content of the atmosphere,
   (c) heating means effective to increase the temperature of the chamber atmosphere without affecting the water vapor content of the atmosphere,
   (d) dehumidifying means continuously operating and effective to continuously remove water vapor from the atmosphere by chilling to the dew point that part of the atmosphere with which it is in contact,
   (e) means for continuously moving the chamber atmosphere into contact with all of said humidifying means, cooling means, heating means and dehumidifying means,
   (f) atmospheric temperature control means including a dry-bulb temperature sensor inside the chamber effective to sense the dry-bulb temperature of the chamber atmosphere, a settable temperature control device outside of the chamber for manually setting the desired dry-bulb temperature of the chamber atmosphere, and first means responsive to the differential between the set temperature and the sensed dry-bulb temperature to control the operation of at at least said cooling means, and
   (g) atmospheric humidity control means including, a wet-bulb temperature sensor inside the chamber effective to sense the wet-bulb temperature of the chamber atmosphere, a settable relative humidity control device outside of the chamber for manually setting the desired differential between the wet-bulb and dry-bulb temperatures of the chamber atmosphere, and second means responsive to the differential between the set wet-bulb/dry-bulb temperature difference and the actual wet-bulb/dry-bulb temperature difference to control the operation of said humidifying means.

2. The system as defined in claim 1 wherein said cooling means includes a cooling coil and compressor for compressing cool refrigerant gas returning from the cooling coil to the compressor inlet to a hot gas at the compressor outlet, and said heating means is operated by circulating the compressed hot gas therethrough to effect thermal transfer from the hot gas to the chamber atmosphere while maintaining the latter two media isolated from one another.

3. The system as defined in claim 1 wherein said humidifying means is a variable rate humidifying means in which the humidifying rate is directly proportionally controlled by the magnitude of the said differential between the set wet-bulb/dry-bulb temperature difference and the actual wet-bulb/dry-bulb temperature difference.

4. The system as defined in claim 1 wherein said cooling means is a variable rate cooling means in which the cooling rate is directly proportionally controlled by the magnitude of the said differential betwen the set temperature and the sensed dry-bulb temperature.

5. The system as defined in claim 1 wherein said heating means is variable rate heating means in which the heating rate is directly proportionally controlled by the magnitude of the said differential between the set temperature and the sensed dry-bulb temperature.

6. The system as defined in claim 1 wherein said cooling means is a variable rate cooling means in which the cooling rate is directly proportionally controlled by the magnitude of the said differential between the set temperature and the sensed dry-bulb temperature, and wherein said heating means is operated continuously at a substantially steady-state thermal input level.

7. The system as defined in claim 1 wherein said cooling means is a variable rate cooling means and said heating means is a variable rate heating means, said cooling and heating means are controllably intercoupled by said first means to effect inverse operation of the cooling rate and the heating rate proportionally to the magnitude and sense of the said differential between the set temperature and the sensed dry-bulb temperature.

8. The system defined in claim 1 wherein said cooling means and said dehumidifying means comprise respectively a cooling coil part and a dehumidifying coil part of a split refrigerating coil each of which coil parts is independently supplied with refrigerant from a common source of liquid refrigerant and which each exhaust the refrigerant that flows therethrough to a common return, the dehumidifying coil part being much smaller in surface area than the cooling coil part and of sufficient size only to effect atmospheric moisture removal at the rate required to achieve dehumidification of the chamber within a specified desired time, said heating means having an instantaneous thermal input capacity at least sufficient to offset the chilling effect on the chamber atmosphere of said dehumidifying coil.

9. The system as defined in claim 6 wherein said cooling means includes a cooling coil and compressor for compressing cool refrigerant gas returning from the cooling coil to the compressor inlet to a hot gas at the compressor outlet, and said heating means is operated by circulating the compressed hot gas therethrough to effect thermal transfer from the hot gas to the chamber atmosphere while maintaining the latter two media isolated from one another.

10. The system as defined in claim 7 wherein said cooling means includes a cooling coil and compressor for compressing cool refrigerant gas returning from the cooling coil to the compressor inlet to a hot gas at the compressor outlet, and said heating means is operated by circulating the compressed hot gas therethrough to effect thermal transfer from the hot gas to the chamber atmosphere while maintaining the latter two media isolated from one another.

11. The system as defined in claim 7 wherein said cooling means includes a cooling coil and a compressor for compressing cool refrigerant gas returning from the cooling coil to the compressor inlet to a hot gas at the compressor outlet, and said heating means is operated by circulating the compressed hot gas therethrough to effect thermal transfer from the hot gas to the chamber atmosphere while maintaining the latter two media isolated from one another, the refrigerant gas emerging from the heating means being mixed with the refrigerant gas returning from the said cooling coil and being recirculated back to the compressor inlet.

12. The system as defined in claim 8 further including a pair of thermostatically controlled expansion valves, a refrigeration compressor and a condenser which latter receives compressed hot refrigerant gas from said compressor, the said commoin refrigerant return being the compressor suction line connected to the inlet of said compressor, said condenser being the aforesaid common source of liquid refrigerant for said cooling coil and dehumdifying coil parts of said split refrigerating coil and supplying each with refrigerant through a separate one of said thermostatically controlled expansion valves, the operation of the expansion valve supplying refrigerant to said dehumidifying coil part being controlled by temperature responsive means connected to the suction line at the compressor inlet to monitor the temperature of the refrigerant gas returning therethrough.

13. The system as defined in claim 8 wherein said cooling means is a variable rate cooling means and said heating means is a variable rate heating means, said cooling and heating means are controllably intercoupled by said first means to effect inverse operation of the cooling rate and the heating rate proportionally to the magnitude and sense of the said differential between the set temperature and the sensed dry-bulb temperature.

14. The system as defined in claim 8 wherein said cooling means also includes a compressor for compressing cool refrigerant gas returning from the cooling coil to the compressor inlet to a hot gas at the compressor outlet, and said heating means is operated by circulating the compressed hot gas therethrough to effect thermal transfer from the hot gas to the chamber atmosphere while maintaining the latter two media isolated from one another, the refrigerant gas emerging from the heating means being mixed with the refrigerant gas returning from the said cooling coil and being recirculated back to the compressor inlet through said common return.

References Cited

UNITED STATES PATENTS

| | | | |
|---|---|---|---|
| 2,143,356 | 1/1939 | Miller et al. | 165—20 |
| 2,177,496 | 10/1939 | Miller et al. | 165—20 |
| 2,309,411 | 1/1943 | Miller et al. | 165—20 |
| 2,310,955 | 2/1943 | Hornfeck | 73—362 |
| 2,713,995 | 7/1955 | Arkoosh et al. | 165—28 |
| 3,316,731 | 5/1967 | Quick | 62—217 |

ROBERT A. O'LEARY, *Primary Examiner.*

CHARLES SUKALO, *Assistant Examiner.*

U.S. Cl. X.R.

62—217; 165—30